(12) United States Patent
Drnevich et al.

(10) Patent No.: US 7,931,888 B2
(45) Date of Patent: Apr. 26, 2011

(54) HYDROGEN PRODUCTION METHOD

(75) Inventors: Raymond Francis Drnevich, Clarence Center, NY (US); Ramchandra M. Watwe, Houston, TX (US)

(73) Assignee: Praxair Technology, Inc., Danbury, CT (US)

( * ) Notice: Subject to any disclaimer, the term of this patent is extended or adjusted under 35 U.S.C. 154(b) by 298 days.

(21) Appl. No.: 12/234,781

(22) Filed: Sep. 22, 2008

(65) Prior Publication Data
US 2010/0074839 A1    Mar. 25, 2010

(51) Int. Cl.
*C01B 3/24* (2006.01)
*C01B 3/12* (2006.01)

(52) U.S. Cl. .......... 423/650; 423/655
(58) Field of Classification Search .......... 423/650
See application file for complete search history.

(56) References Cited

U.S. PATENT DOCUMENTS 4,025,318 A * 5/1977 Moody et al. .......... 48/213
6,780,395 B2 * 8/2004 Narayan .......... 423/650

OTHER PUBLICATIONS

Dybkjaer et al., "Advanced Reforming Technologies for Hydrogen Production", Hydrocarbon Engineering, 1997, pp. 56-65.
Foster Wheeler, "Hydrogen Plants for the New Millennium", Middle East Petrotech Conference and Exhibition, 2001.
Gray et al., "Polygeneration of SNG, Hydrogen, Power, and Carbon Dioxide from Texas Lignite", Mitretek Report, 2004.
Broadhurst et al., "Effects of Hydrocarbon Feed Type on Operating Costs and Environmental Impact on a Steam Reforming Based Hydrogen Plant", International Topical Conference on Refinery Processing, 2005.
Schmetz et al., "Hydrogen from Coal Program", draft report prepared by NETL, U.S. DOE, 2005.

* cited by examiner

*Primary Examiner* — Melvin C Mayes
*Assistant Examiner* — Kenneth Vaden
(74) *Attorney, Agent, or Firm* — David M. Rosenblum (57) ABSTRACT

A method of producing a hydrogen product stream in which a steam stream is reacted with a hydrocarbon containing stream within a steam methane reformer. The resulting product stream is subjected to a water gas shift reaction and then to pressure swing adsorption to produce the hydrogen product stream. The hydrocarbon stream is alternatively formed from a first type of feed stream made up of natural gas, refinery off-gas, naphtha or synthetic natural gas or combinations thereof and a second type that is additionally made up of a hydrogen and carbon monoxide containing gas. During use of both of the types of feed streams, the flow rate of the steam stream is not substantially changed and reformer exit temperatures of both the reactant and the flue gas side are held essentially constant.

12 Claims, 5 Drawing Sheets

HYDROGEN PRODUCTION METHOD

FIELD OF THE INVENTION

The present invention relates to a method for producing hydrogen in which a hydrocarbon containing stream is reacted with steam in a steam methane reformer to produce a hydrogen containing intermediate product stream that is subsequently subjected to a water gas shift reaction to produce additional hydrogen and to pressure swing adsorption to separate the hydrogen and thereby to produce the hydrogen product stream. More particularly, the present invention relates to such a method in which the hydrocarbon stream can be alternatively formed from a methane containing feed or a feed that additionally contains hydrogen and carbon monoxide.

BACKGROUND OF THE INVENTION

Hydrogen has many current industrial uses and potential future uses involving the supply of energy in fuel cells. For example, there presently exists a continuing need for hydrogen to treat high sulfur content crude oil in the production of fuels. In the future, hydrogen may be used as an automotive fuel or more generally, in the generation of electricity.

Hydrogen is currently produced in steam methane reforming installations. In such installation, a hydrocarbon containing feed, typically natural gas, is combined with steam and then introduced into reformer tubes located within a fired furnace of the reformer. The reformer tubes contain a catalyst to catalyze the well known, endothermic steam methane reforming reaction in which methane and steam are reacted to form carbon monoxide and hydrogen. In addition, an exothermic water gas shift reaction occurs in which carbon monoxide and steam are reacted to form carbon dioxide and additional hydrogen. Typically, the hydrocarbon containing feed is natural gas and part of such feed is combined with steam and introduced into the reformer tubes and another part of the feed is fed to burners firing into the furnace section to support the steam methane reforming reaction. In typical steam methane reformers, the steam to carbon molar ratio is set at about 2.8.

The heated product stream of the steam methane reforming reaction is cooled and subjected to a high temperature shift reaction to react the carbon monoxide with residual steam to produce additional hydrogen. The resulting shifted stream is then introduced into a pressure swing adsorption unit in which the hydrogen is separated to form a product stream and a stream of tail gas is produced that can be introduced into the burners to help fire the furnace section of the steam methane reformer.

Steam methane reformers also have a convective section connected to the furnace section in which flue gas is routed to heat boiler feed water and to produce steam. The boiler feed water after deaeration and heating to near its boiling temperature is then introduced into a steam drum. Water from the steam drum is partially vaporized in the boiler and returned to the steam drum as low quality steam. Steam from the steam drum is introduced into a superheater in the convective section to form superheated steam. The superheated steam is combined with the hydrocarbon feed to produce the reactant stream for the steam methane reformer and part of the superheated steam can be advantageously exported at a profit. The flue gas is discharged from the convective section through a stack.

Steam methane reformers can utilize a variety of feed stocks, for instance, refinery off-gases, natural gas, butane, light naphtha and naphtha. All of these are hydrocarbon containing feeds. In Broadhurst et al., "Effects of Hydrocarbon Feed Type on Operating Costs and Environmental Impact on a Steam Reforming Based Hydrogen Plant", AICHE (2005), various feeds were tested against one another by simulation at a steam to carbon ratio of 3.0 and a reformer exit temperature of 880° C. The feed rates were allowed to vary so that a target hydrogen output of 100 MMSCFD was produced. From the simulations, it was concluded that the environmental impact increases in terms of higher carbon dioxide emissions and lower process efficiency as the feed stock becomes heavier. This being said, it was surmised in this reference that the selection of the feed stock will be dominated by feed stock/fuel costs.

Another method of producing hydrogen is gasification in which a carbonaceous material such as coal, petroleum or biomass is converted into a synthesis gas that contains hydrogen and carbon monoxide. The carbonaceous material is reacted at high temperatures with oxygen addition within a gasifier to produce the synthesis gas. For example, in one type of gasifier that is used in the gasification of coal, the coal is pulverized and fed into the gasifier. Other types of gasifiers utilize a coal slurry. Within the gasifier, the coal is heated and volatiles are released creating a char. The volatile product and some of the char is reacted with the oxygen to form carbon dioxide and carbon monoxide. The char also reacts with the carbon dioxide and steam to produce the carbon monoxide and hydrogen. In addition, carbon monoxide and steam also react in water gas shift reactions to produce carbon dioxide and additional hydrogen. The resulting hydrogen and carbon monoxide containing synthesis gas can be processed and hydrogen can be separated from the synthesis gas by pressure swing adsorption.

In Gray et al. "Polygeneration of SNG, Hydrogen, Power, and Carbon Dioxide from Texas Lignite", Mitretek Systems (2004), the gasification of lignite is discussed in connection with the production of electric power, hydrogen, synthetic natural gas and carbon dioxide. In this reference, the purpose of such gasification is to allow the electric power to be sold to the grid, the hydrogen to be sold to a pipeline for use in oil refining operations and the synthetic natural gas to be sold as a natural gas supplement or to replace natural gas in steam methane reforming operations, thereby to provide hydrogen for the refining operations. The carbon dioxide that is generated by the gasification can be sequestered or used for enhanced oil recovery.

In one plant configuration shown in Gray, the lignite is gasified to produce a synthesis gas. The synthesis gas is subjected to water gas shift reactions to increase the hydrogen. After removal of mercury, sulfur and carbon dioxide, the shifted stream is then passed into a sulfur guard bed and then into a methanation unit to produce synthetic natural gas. Sulfur can be extracted in a Claus unit for sulfur recovery. The carbon dioxide can be compressed to 2,000 psi and fed to a pipeline. To protect the methanation catalyst, the purified and shifted syngas is sent to a sulfur polishing reactor to remove the last traces of hydrogen sulphide before being sent to the methanation reactor. In the methanation reactor the carbon dioxide and hydrogen are reacted to produce methane. The resulting synthetic natural gas is compressed for delivery to a natural gas pipeline. Some of the synthesis gas can be sent to a gas turbine where electric power is generated. The hot effluent from the gas turbine can be used in a heat recovery steam generator to generate high pressure steam that is used in a steam turbine to generate additional electrical power.

In another plant design that is shown in Gray, after carbon dioxide removal, the purified and shifted syngas is sent to a polymer membrane separation system followed by a pressure swing adsorption unit where hydrogen is removed. The remaining synthesis gas is then sent to a gas turbine for electric power generation. The heated effluent from the turbine is then sent to a heat recovery steam generator to generate high pressure steam for use in a steam turbine to generate additional power.

As is apparent from the above description of the prior art, steam methane reformers can utilize a variety of feeds, natural gas, refinery off-gas, synthetic natural gas and mixtures of synthetic natural gas and natural gas. Obviously, the amount of synthetic natural gas utilized as a feed to a steam methane reformer will depend upon such economic factors as the price of natural gas.

As will be discussed, the present invention provides a closer integration between a gasifier and a steam methane reformer then has been contemplated in the prior art. Among other advantages, a method in accordance with the present invention allows the hydrogen to be produced in a steam methane reformer with the use of less natural gas or synthetic natural gas than is possible in the prior art. Thus, the present invention permits use of natural gas or production of synthetic natural gas to be more widely varied in response to external economic conditions than is possible in the prior art. As will be discussed, yet further advantages of the present invention concern the possibility of simplifying the construction of the gasification facility and providing for a more reliable hydrogen supply than is currently possible with the use of a gasification facility alone.

SUMMARY OF THE INVENTION

The present invention provides a method of producing a hydrogen product stream. In accordance with the method, a steam stream is combined with a hydrocarbon containing stream to produce a reactant stream. Hydrocarbons are reacted with steam contained in the reactant stream in a steam methane reformer to produce an intermediate product stream. The hydrocarbon stream is alternately formed from a first feed stream and a second feed stream without substantially changing flow rate of the steam stream and while maintaining reformer exit temperatures at both the reactant and flue gas side essentially constant and flow rate of the flue gas essentially constant. The first stream is made up of at least one of natural gas, refinery off-gas, naphtha and synthetic natural gas. The second feed stream is made up of a hydrogen and carbon monoxide containing gas and at least one of natural gas, the refinery off-gas, naphtha and the synthetic natural gas. A part of a synthesis gas stream, formed by a gasifier, is utilized in production of the hydrogen and carbon monoxide containing gas. The intermediate product stream produced by the steam methane reformer is subjected to a water gas shift reaction to produce a shifted stream. The hydrogen is separated from the shifted stream in a pressure swing adsorption unit to produce the hydrogen product stream.

It is appropriate here to point out, that by maintaining the reformer exit temperature at the reactant side, in other words, the temperature of the intermediate product stream upon directly leaving reformer tubes essentially constant, methane slip is controlled to maximize hydrogen production. The maintenance of the flue gas side temperature essentially constant, or in other words, the flue gas temperature before reaching the convective section of the steam methane reformer essentially constant, coupled with the maintenance of the flue gas flow rate essentially constant, the amount of steam generated in the convective section of the steam methane reformer can be maintained at an essentially constant flow rate. And be maintaining the steam flow rate essentially constant, the steam to carbon ratio will increase with the use of the hydrogen and carbon monoxide containing stream in the second feed stream to allow the increased carbon monoxide content of the feed to be subjected to the water gas shift reaction to an increased extent within the steam methane reformer and to provide steam to the water gas shift reaction occurring in the shift conversion unit used in the processing of the intermediate product stream. The end result of such control is to allow the same amount of hydrogen to be produced when the feed to the steam methane reformer is switched to the second feed stream.

As is apparent from the above description, the use of part of the synthesis gas to form a hydrogen and carbon monoxide containing stream that can serve as part of the feed to a steam methane reformer has the obvious advantage of not using the same amount of natural gas or synthetic natural gas or refinery off-gas in the production of the hydrogen. As a result, there can be less utilization of these gases to not only produce a cost savings but to allow the synthetic natural gas to be available for sale. A yet further savings is brought about due to the fact that the carbon monoxide content of the feed to the steam methane reformer when synthesis gas is used will allow the exothermic water gas shift reaction to occur at a greater extent. The heat produced by such reaction as well as the reduction in hydrocarbon feed rate to the reformer will reduce the amount of fuel that would otherwise be required to fire burners utilized within the furnace section of the steam methane reformer. Such fuel is provided by part of the feed to be reacted that can contain natural gas refinery off-gas, naphtha or synthetic natural gas and combinations thereof.

Additionally, as mentioned above, the present invention allows for certain economic advantages to be realized in the construction of the gasification facility 2 and for the hydrogen to be supplied on a more reliable basis. If hydrogen production were to be made part of the gasification project, then the gasification facility would require a second shift conversion and a pressure swing adsorption unit as well as associated heat exchangers, piping and etc. Although the use of a hydrogen and carbon monoxide containing stream from a unit designed to produce hydrogen is contemplated by the present invention, the present invention certainly allows for a simplified and less expensive gasification train within the gasification facility. Additionally, a gasifier has between about a 85 percent and about 90 percent on stream factor while a steam methane reformer has about a 98 percent on-stream factor. The steam methane reformer can be switched between the two types of feed streams thereby increasing the reliability of the hydrogen supply. This is important where a steam methane forming facility exists and the gasifiers are being built at a later time. Other advantages will become apparent from the discussion that will follow below.

The part of a synthesis gas stream, formed by the gasifier can also be utilized in production of the synthetic natural gas. However, as will be discussed, the gasifier facility might also use an excess synthesis gas production capacity to generate electrical power.

In a specific embodiment where the gasifier facility also produces synthetic natural gas, the water gas shift reaction that is used in connection with the intermediate product stream produced by the steam methane reformer can be a second water gas shift reaction. The synthesis gas stream can be utilized to produce synthetic natural gas and the hydrogen and carbon monoxide containing gas by subjecting the synthesis gas stream to a first water gas shift reaction to produce the partially shifted gas stream. The partially shifted gas stream can be subjected to acid gas removal to form a purified partially shifted gas stream. The hydrogen and carbon monoxide containing gas can be formed from a portion of the purified partially shifted gas stream and a remaining portion of the purified partially shifted gas stream can be subjected to methanation to produce a synthetic natural gas. In such case, the first feed stream is formed from at least one of a natural gas stream containing the natural gas, a refinery off-gas stream containing the refinery off-gas and a synthetic natural gas stream containing at least part of the synthetic natural gas produced by the methanation. The first feed stream is introduced into a hydrotreater to convert any sulfur species within the first feed stream to hydrogen sulphide and then into an adsorbent bed to adsorb the hydrogen sulphide. The second feed stream is formed by passing the at least one of the natural gas stream, the refinery off-gas stream and the synthetic natural gas stream into the hydrotreater and then into an adsorbent bed and combining the portion of the partially shifted gas stream therewith, either prior to or after the adsorbent bed.

In another embodiment, again, the water gas shift reaction that is used in connection with the intermediate product stream produced by the steam methane reformer can be a second water gas shift reaction. The synthesis gas stream is utilized to produce a synthetic natural gas and the hydrogen and the carbon monoxide containing gas is produced by forming the hydrogen and carbon monoxide containing gas stream from part of the synthesis gas stream. A remaining part of the synthesis gas stream is subjected to a first water gas shift reaction to produce a partially shifted gas stream. The partially shifted gas stream is subjected to acid gas removal to form a partially shifted gas stream. The partially shifted gas stream is subjected to methanation to produce a synthetic natural gas. In such case, the first feed stream can be formed from at least one of the natural gas streams containing the natural gas, a refinery off-gas stream containing the refinery off-gas and synthetic natural gas stream containing at least part of the synthetic natural gas produced by the methanation. The first feed stream is introduced into a hydrotreater to convert any sulfur species within the first feed stream to hydrogen sulphide and then into an adsorbent bed to adsorb the hydrogen sulphide. The second feed stream is formed by passing the at least one of the natural gas stream, the refinery off-gas and the synthetic natural gas stream into a hydrotreater and then combining the part of the synthesis gas stream therewith to form a combined stream and then passing the combined stream into the adsorbent bed.

In any embodiment, the hydrogen can be separated from a shifted stream in a pressure swing adsorption unit that also produces a tail gas stream. At least part of the tail gas stream can be used as part of the fuel supplied to burners firing into a furnace section of the steam methane reformer. Another part of the tail gas stream can be used as a fuel for duct burners firing into a convective section of the steam methane reformer.

The flow rate of steam should be sufficient to produce a steam to carbon molar ratio of between about 2.0 and about 4.0 when the first feed stream is used. Preferably, the reformer exit temperature at the flue side is between about 1600° F. and about 2000° F. and at the reactant side is between about 1450° F. and about 1700° F. The partially shifted synthesis gas stream can have a hydrogen to carbon monoxide molar ratio of between about 2.8 and about 3.3.

BRIEF DESCRIPTION OF THE DRAWINGS

While the specification concludes with claims distinctly pointing out the subject matter that Applicants regard as their invention, it is believed that the invention will be better understood when taken in connection with the accompanying drawings in which:

In order to avoid needless repetition, the same numbers are utilized for elements of the Figures having the same description.

DETAILED DESCRIPTION

Figure 1:
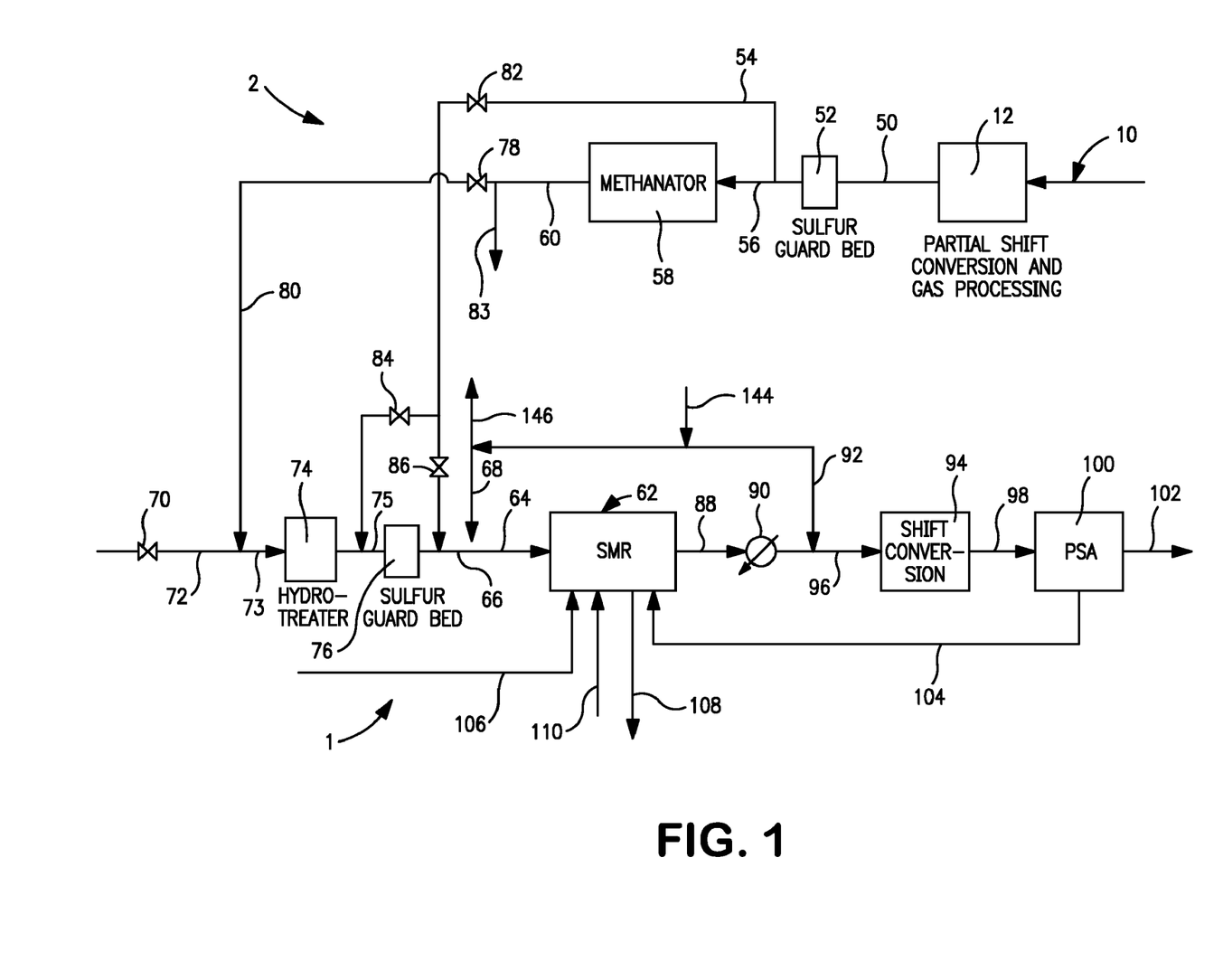
FIG. 1 is a process flow diagram of an apparatus used in carrying out a method in accordance with the present invention.

With reference to FIG. 1 a hydrogen production facility 1 is illustrated in which the hydrogen is produced from external feeds of natural gas or refinery off-gases and synthetic natural gas and blends thereof, either alone or along with a synthesis gas produced in a gasifier facility 2 by a gasifier (not shown) that is used to also form the synthetic natural gas. It is understood that hydrogen production facility 1 and gasifier facility 2 might not be situated in the same location. In this regard, the hydrogen production facility 1 could be an existing facility in which hydrogen production is carried out with reformer feed streams supplemented by products of the gasifier facility 2 that was constructed at a later time.

As illustrated, a synthesis gas stream 10 is subjected to partial shift conversion and gas processing as generally indicated in stage 12. Synthesis gas stream 10 is created by the gasifier. If the gasifier facility 2 is not located on the same premises as hydrogen production facility 1, a hydrogen and carbon monoxide containing stream 54, to be discussed, may be introduced into the hydrogen production facility 1 through a pipeline. As will also be discussed, the synthesis gas stream 10 produced by a gasifier within the gasifier facility 2 is utilized to produce a synthetic natural gas and for alternate use in the steam methane reforming of a hydrocarbon containing feed utilized in hydrogen production facility 1 that can include the synthetic natural gas. It is to be noted, however, that the present invention contemplates gasification facilities in which the synthetic natural gas used in producing the hydrogen and carbon monoxide containing stream 54 is introduced into a gas turbine for production of electricity and that does not employ a methanation unit to produce synthetic natural gas.

Figure 2:
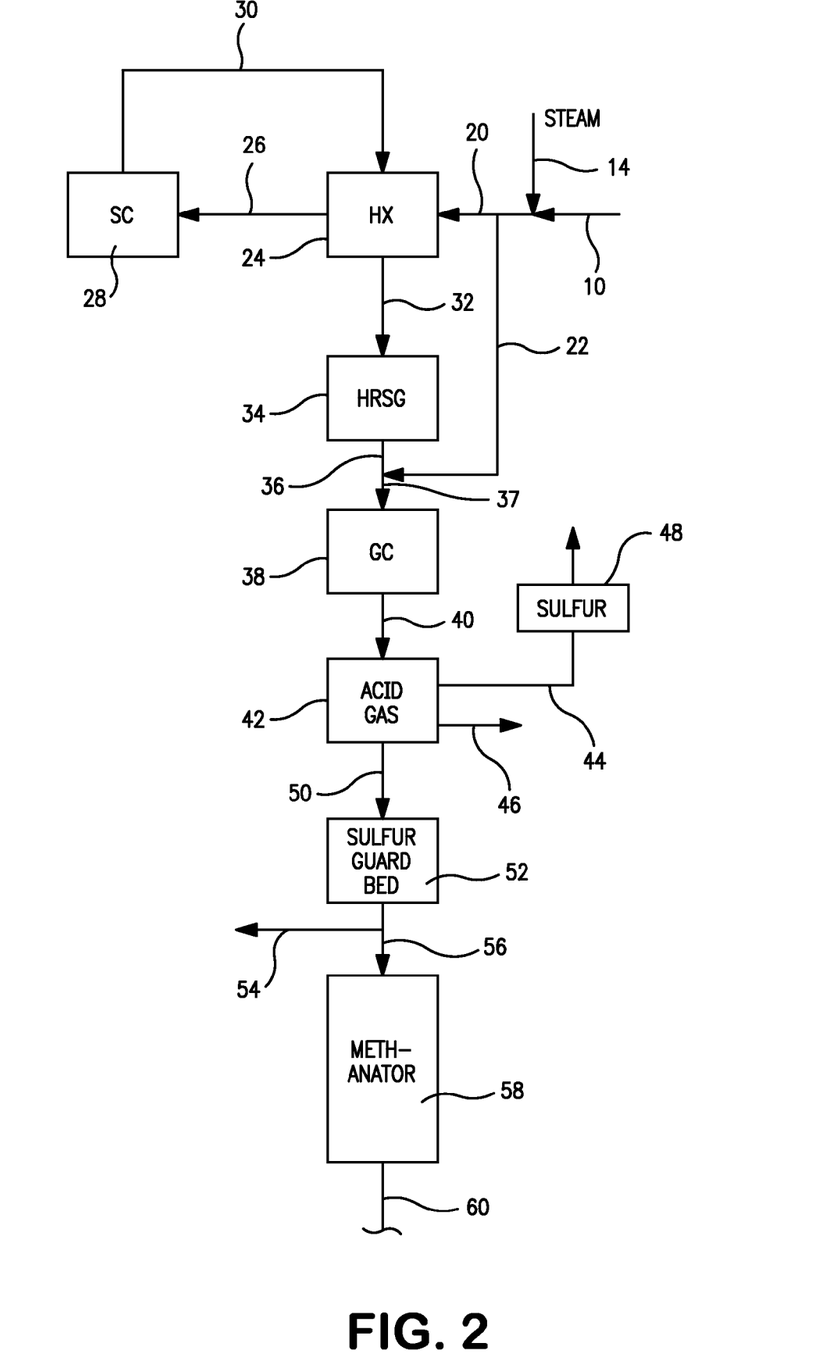
FIG. 2 is a more detailed diagram of the partial shift conversion in gas processing that is employed in FIG. 1 and FIG. 4.

A more detailed explanation of stage 12 is shown in FIG. 2. With brief reference to FIG. 2, a supplemental steam stream 14 may be added to synthesis gas stream 10 if required to drive the shift conversion shift reactions that will be discussed. Synthesis gas stream 10 either alone or combined with supplemental steam stream 14 can be divided into a first feed stream 20 and a second feed stream 22. First feed stream 20 is introduced into a heat exchanger ("HX") 24 to preheat the first feed stream 20. It is understood that the division of synthesis gas stream 10 or a combined stream that would also include steam stream 14 is optional and all of the feed could be introduced into heat exchanger 24. As would occur to one skilled in the art, the use of supplemental steam would depend upon the amount of steam in the synthesis gas stream 10. The division of the feed is performed in the illustrated embodiment to produce the desired hydrogen to carbon monoxide ratio in the partially shifted gas stream 37, discussed below. However, whether the addition of steam is necessary or whether any division of the feed is required, will, as would occur to one skilled in the art, be dependent upon the type of gasifier used in the production of the synthesis gas stream 10 and therefore, the makeup of such stream. The resulting preheated stream 26 is then introduced into a shift conversion unit 28 to produce the partly shifted gas stream 30. Within shift conversion unit 28, carbon monoxide and water produces carbon dioxide and hydrogen. A typical shift conversion unit 28 would employ a catalyst such as magnetite or another transmission metal or metal oxide. The partially shifted gas stream 30 is then passed back through heat exchanger 24 to preheat the incoming first feed stream 20.

The partially shifted gas stream 30 after passage through heat exchanger 24 is passed as a stream 32 through heat recovery steam generator 34. Heat recovery steam generator 34 ("HRSG") generates steam that could be used in conjunction with the steam turbine to generate electricity or as steam for export. The resulting partly shifted gas stream is then introduced as a stream 36 or is combined with second feed stream 22 to produce a partially shifted gas stream 37. The hydrogen to carbon monoxide ratio within partially shifted gas stream 37 is preferably between about 3.0 and about 3.2. Partially shifted gas stream 37 is introduced into gas cooler ("GC") 38 that produces lower pressure steam by heating and vaporizing boiler feed water and rejecting low level heat to the boiler feed water and to the atmosphere through heat exchange with cooling water or air cooled heat exchangers (called fin-fan heat exchangers.) Although not illustrated, part of the heated boiler feed water can then, in a manner known in the art, can be fed to heat recovery steam generator 34 for producing higher pressure steam.

As a result of the gas cooling within gas cooler 38, most of the water that is not used in shift conversion is condensed and the resulting cooled, partially shifted gas stream 40 is at a temperature close to ambient. Such stream is introduced into an acid gas removal unit 42 ("acid gas"). In acid gas removal unit 42, a physical absorbent such as methanol is used to absorb the sulfur compounds and the carbon dioxide in an absorbent tower having mass transfer contacting elements to contact the physical absorbent with the cooled, partially shifted gas stream. Absorbent regeneration in such unit, as well known in the art, can be accomplished so that one desorbed stream has a high concentration of sulfur compounds, namely, stream 44 and the other stream 46 is nearly pure carbon dioxide. Stream 44 is then sent to unit 48 ("sulfur") in which sulfur compounds are either converted to elemental sulfur for sale to the chemical market in known Claus reaction units that can incorporate downstream catalytic stages to separate the sulfur or sulfuric acid. The carbon dioxide contained in stream 46 can be captured and used for enhanced oil recovery or injected into deep saline aquifer for sequestration.

With reference again to FIG. 1, the resulting purified partially shifted gas stream 50 can optionally be introduced into a sulfur guard bed 52 containing zinc oxide to adsorb any hydrogen sulphide that may still be present within purified partially shifted gas stream 50. However, purified partially shifted gas stream 50 after passage through sulfur guard bed 52 or possibly without the use of sulfur guard bed 52 is divided into a hydrogen and carbon monoxide containing stream 54 that consists of part of the purified partially shifted gas stream 50 and a remaining portion 56 that is introduced into a methanator in which hydrogen and carbon monoxide are combined to form methane or a synthetic natural gas which is discharged as a synthetic natural gas stream 60 after further treatment (not shown) that can include water removal through cooling and condensation, drying, and possibly $CO_2$ removal.

As will be discussed, hydrogen and carbon monoxide containing stream 54 and synthetic natural gas stream 60 can be used in forming feeds to a steam methane reformer 62. The feed to steam methane reformer 62 consists of a reactant stream 64 that is formed of a hydrocarbon containing stream 66 and a steam stream 68 that consists of superheated stream after preheating within the steam methane reformer 62. In the illustrated embodiment, a valve 70 can be opened to admit a stream 72 that consists of a natural gas stream or a refinery off-gas stream or a naphtha stream or a blend of such streams. Stream 72, either alone or with optional hydrogen recycle of a hydrogen recycle stream 103, shown in FIG. 3, or optionally with a first stream 80 of synthetic natural gas (both to be discussed) which, after preheating, is introduced as a stream 73 into a hydrotreater 74. As known in the art, within hydrotreater 74, the sulfur species that are in stream 73 are converted into hydrogen sulphide. The hydrogen sulphide is then removed from such stream by a sulfur guard bed 76 that can be a zinc oxide bed. Another possibility would be to close valve 70 and open valve 78. Hydrocarbon containing stream 66 would then be formed of a first stream 80 of the synthetic natural gas. In either case, a second stream 83 of the synthetic natural gas would be available for export and sale. Obviously, when valve 78 is set in the closed position, more synthetic natural gas is available for export or sale. Alternatively, it would be possible to open both valves 78 and 70. In such case, the hydrocarbon containing stream 66 would be formed of a blend of natural gas, a blend of the synthetic natural gas and the refinery off-gas, a blend of the vaporized naphtha or a blend of all four components namely the natural gas, the refinery off-gas, the naphtha and the synthetic natural gas.

Embodiments of the present invention are possible, however, in which all of the synthetic natural gas stream 60 is available for export and the hydrocarbon containing stream 66 is never formed from synthetic natural gas. As indicated above, synthetic natural gas might not be produced in a particular gasification facility to which hydrogen production facility has access to the product streams thereof. In either of such cases, the hydrocarbon containing stream 66 could exclusively be formed from natural gas or exclusively from refinery off-gas or exclusively by naphtha or by a blend thereof. All of these examples would constitute a first type of feed stream.

A second type of feed stream is also used that is formed of a hydrogen and carbon monoxide containing gas stream 54 which as indicated above would be a partially shifted synthesis gas stream. In such case, a valve 82 is set in an open position along with either a valve 84 or 86. Valve 84 is set in an open position when it is desired to make certain that there are no hydrogen sulphide present within the hydrogen and carbon monoxide containing feed to be used in forming the hydrocarbon containing feed 66 by passing the hydrogen and carbon monoxide containing gas stream 54, after preheating, into sulfur guard bed 76. As illustrated, a stream 75 is passed into sulfur guard bed 76 that therefore, can consist of heated hydrogen and carbon monoxide containing stream 54 and stream 73 or stream 73 alone. Alternatively, valve 86 can be set in an open position so that hydrogen and carbon monoxide containing gas stream 54 will by-pass sulfur guard bed 76.

The valve setting will depend upon the source of the stream being fed to the gasifier and its sulfur content and/or the type of gasifier and the sulfur removal equipment used in connection with such gasifier. However, in either valve setting, part of the hydrocarbon containing stream 66 consists of the hydrogen and carbon monoxide containing stream 54 and either natural gas, a refinery off-gas, synthetic natural gas or various mixtures thereof.

In both types of feed streams, the passage of the reactant stream 64 through steam methane reformer 62 produces an intermediate product stream 88 that is passed through a process gas boiler 90 to cool intermediate product stream 88 to a suitable temperature to a second shift conversion unit 94. Optionally, a superheated steam stream 92 is combined with intermediate product stream 88. Stream 96 that consists of the cooled intermediate product stream 88 or optionally, such stream mixed with superheated steam is then passed through the second shift conversion unit 94. Superheated steam stream 92 would be used when there is not enough steam generated to achieve a sufficient steam to carbon ratio for the shift conversion unit 94. Shift conversion unit 94 is a high temperature shift conversion unit. This produces a shifted stream 95 shown in FIG. 3, that, after cooling in heat exchangers associated with steam methane reformer 62, is passed as a cooled shifted stream 98 into a pressure swing adsorption unit 100 to produce a hydrogen product stream 102.

The separation of hydrogen from the cooled shifted stream 98 produces a tail gas stream 104 that can be used in firing the steam methane reformer 62 along with a stream 106 that consists of either natural gas, refinery off-gas or synthetic natural gas or blends thereof. Steam methane reformer 62 discharges a stack gas stream 108 that is composed of the flue gas produced by such combustion.

Figure 3:
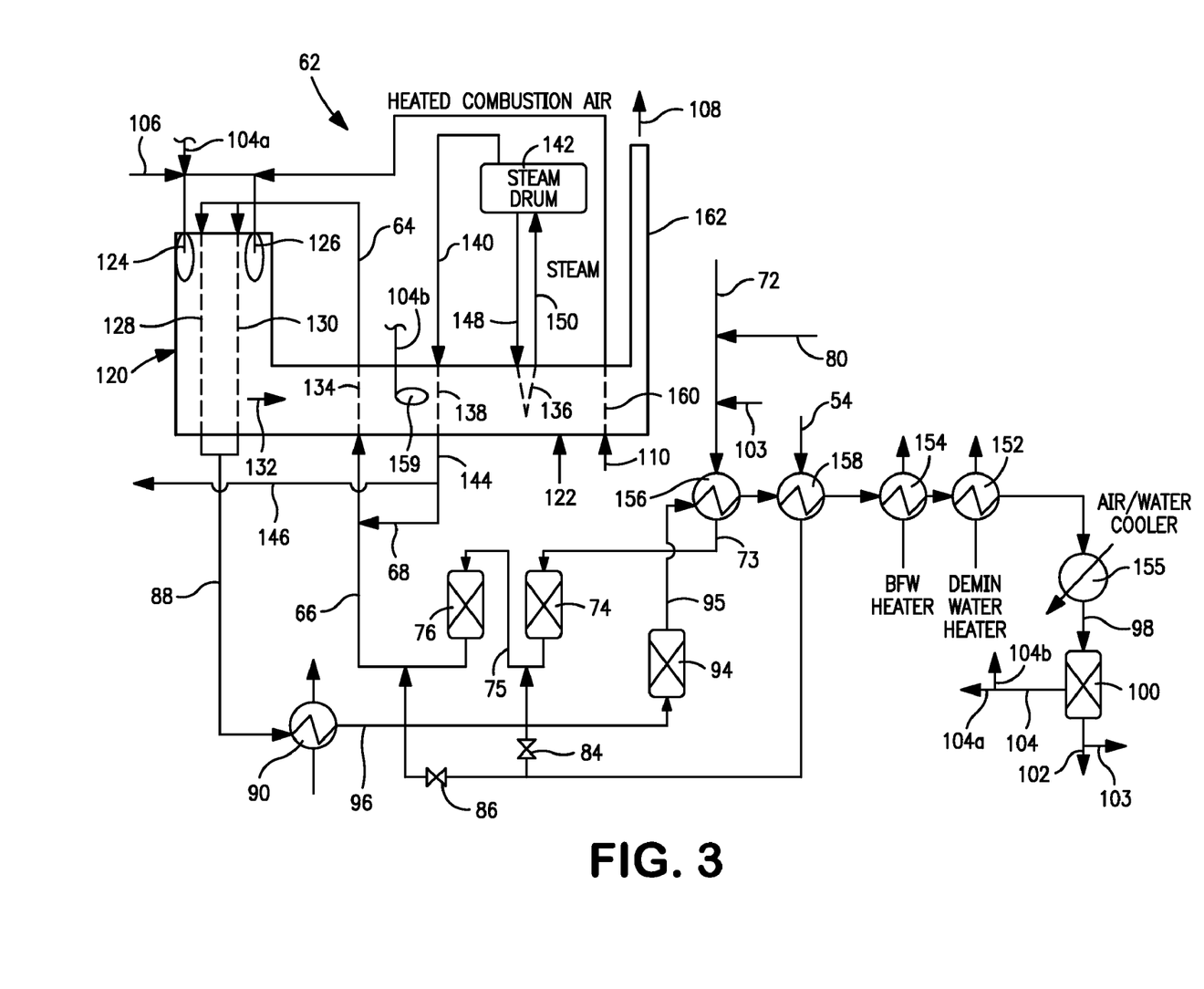
FIG. 3 is a schematic diagram of a steam methane reformer shown in FIG. 1.

With reference to FIG. 3, a more detailed schematic is illustrated with respect to steam methane reformer 62. Steam methane reformer 62 includes a reactor section 120 and a convective section 122. As illustrated, burners 124 and 126 fire into reactor section 120 to heat reactor tubes 128 and 130. Although only two burners are shown and two reactor tubes are shown in the illustration, as would be known to those skilled in the art, there would be multiple burners in a steam methane reformer as well as several hundred of such reactor tubes. As mentioned above, all or part of the tail gas stream 104 as a part thereof as a stream 104a could be fed to the burners 124 and 126 as part of the fuel feed. In the particular embodiment shown in FIG. 3, only a part of tail gas stream 104a is fed to burners 124 and 126.

Reactor tubes 128 and 130 are fed by reactant stream 64 after having been heated. In this regard, a flue gas stream 132 produced by the combustion occurring within reactor section 120 is then used to heat reactant stream 64 in a heat exchanger 134 that is located within convective section 122. Further heat exchangers 136 and 138 are provided within the convective section 122 to raise and superheat steam. A steam stream 140 from a steam drum 142 is superheated within heat exchanger 138 to produce a superheated steam stream 144. Superheated steam stream 144 is divided into steam stream 68 and an export steam stream 146. Although not illustrated, the steam generated by process gas boiler 90 is superheated within convective section 122 and then used as part of the makeup of steam stream 68 or optionally superheated steam stream 146. The steam is raised within steam drum 142 by passing boiler water stream 148 into heat exchanger 136 to produce steam containing stream 150 that is fed back to steam drum 142. Steam drum 142 is fed with water heated in a demineralized water heater 152 and an upstream boiler feed water heater 154 through indirect heat exchange with shifted stream 95.

Although not illustrated, but as would be known to those skilled in the art, the resulting heated water discharged from boiler feed water heater 154 would have been deaerated after leaving heat exchanger 152 and prior pumping to raise the water pressure which is subsequently fed to heat exchanger 154. Additionally, the shifted stream 98 is cooled within a cooler 155 which as known in the art is a combination of air cooler and cooling water. After water is condensed out, the shifted stream 98 is fed to pressure swing adsorption unit 100 to separate hydrogen and to produce the hydrogen product stream 102. It is to be noted that shifted stream 95 in addition passes through preheaters 156 and 158 in order to preheat the feed streams, for example, hydrogen and carbon monoxide containing stream 54, stream 72 and potentially synthetic natural gas stream 80 and a hydrogen stream 103 that can optionally be formed from part of the product stream 102 and recirculated if needed for the hydrotreater 74.

As shown in the drawings, part of the tail gas stream 104 as a stream 104b could optionally be fed to a duct burner 159 firing within convective section 122 to make use of any excess tail gas not needed in firing the burners. Alternatively, excess tail gas could be exported. Although it is shown as downstream of heat exchanger 134, other locations are possible. Duct burner 159 could be used when the second type of feed is used for steam methane reformer 62 and the fuel is being cut back due to the heat generated by water gas shift reactions and lower hydrocarbon feed rates.

Although not illustrated, the flue gas stream 132 can pass through a selective catalytic reduction unit to convert nitrogen oxides to nitrogen and water that are contained within flue gas stream 132. The low Nox flue gas stream would then pass to air preheater 160 to heat air stream 110. The flue gas stream is then discharged from a flue gas stack 162 as flue gas stream 108.

Figure 4:
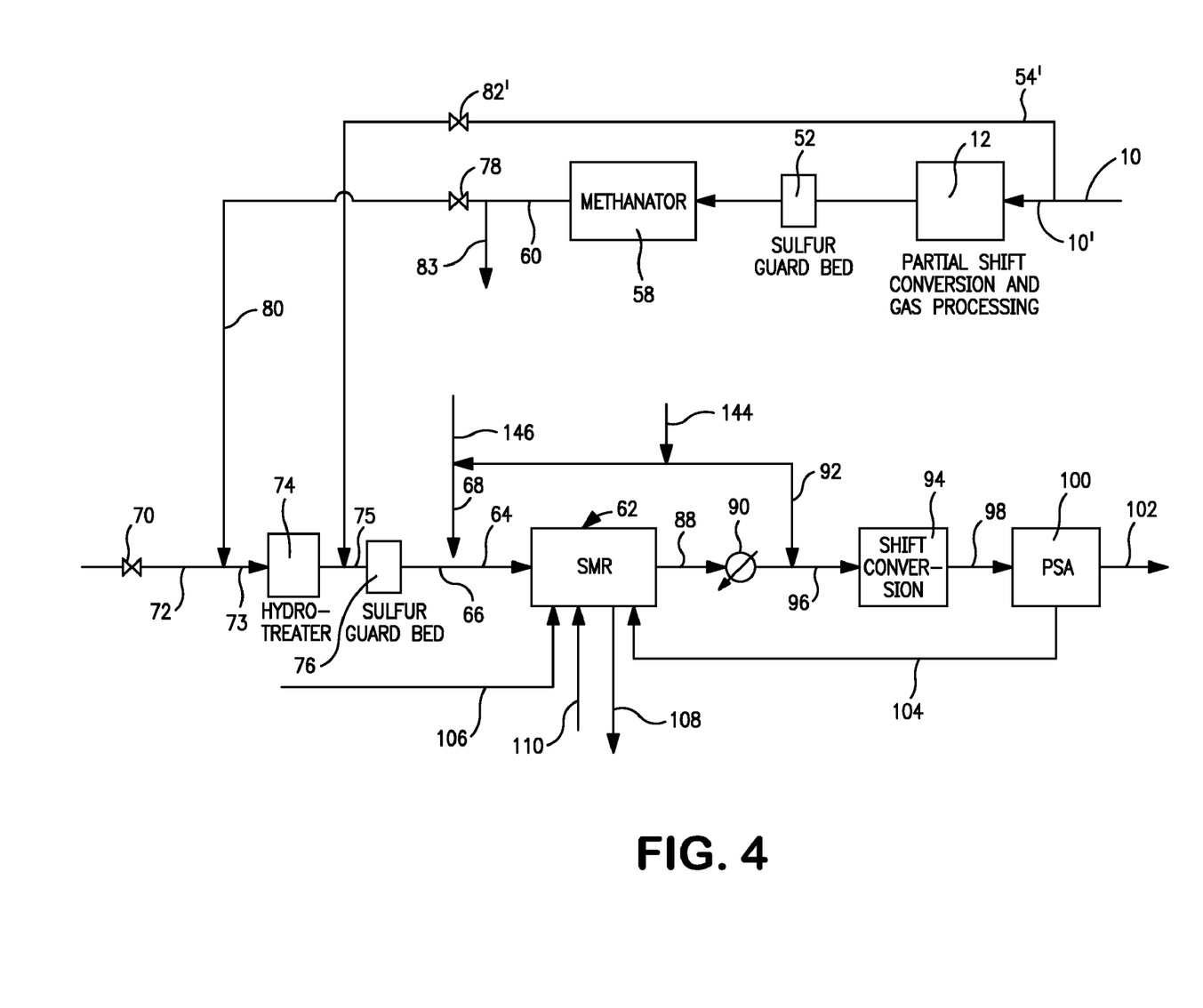
FIG. 4 is a process flow diagram of an apparatus utilized in carrying an alternative embodiment of a method in accordance with the present invention.

With brief reference to FIG. 4, an alternative embodiment of FIG. 1 is illustrated in which a hydrogen and carbon monoxide containing gas stream 54' is created from part of synthesis gas stream 10. In such case the remaining part 10' of synthesis gas stream 10 is introduced into partial shift and conversion and gas processing apparatus 12 that is more particularly illustrated in FIG. 2. The second type of feed stream can thereby be formed from part of the synthesis gas stream and when desired, valve 82' can be open to admit such gas between the hydrotreater 74 and the sulfur guard bed 76 in that such stream will contain hydrogen sulphide. However, it is likely that such stream would be introduced upstream of hydrotreater 74 because if fed to hydrotreater 74 the carbon monoxide and hydrogen contained in 54' would react to form methane and the associated temperature rise would be in excess of that permitted for conventional hydrotreater catalysts. In addition, the formation of methane would reduce the overall efficiency of using syngas as feed to the reformer. As illustrated in FIG. 4, there are no valves 84 and 86 in that all of the hydrogen and carbon monoxide containing stream 54' will be introduced into the sulfur guard bed when used. Therefore, such valves and associated piping would not be included in FIG. 3. The description of FIG. 4 is otherwise the same as that given above for FIG. 1.

It is to be noted, that although the embodiments shown in FIGS. 1 and 4 utilize a hydrogen and carbon monoxide containing stream 54 and 54' taken either before or after the unit operations contemplated in partial shift conversion and gas processing 12, it is possible to take a hydrogen and carbon monoxide containing stream at other locations. For example, such a stream could be taken before sulfur guard bed 52 or prior to the acid gas removal stage 42.

As indicated above, the use of the hydrogen and carbon monoxide containing stream that is either a synthesis gas or a partially shifted synthesis gas allows a hydrogen production facility to be operated on the most profitable basis given the selling prices of the feeds, for example, natural gas, refinery off-gas, synthesis gas and synthetic natural gas. Furthermore, as also mentioned, the gasification facility 2 has a gasification train that does not incorporate a second shift conversion and a pressure swing adsorption unit to produce hydrogen. Thus, gasification facility 2 takes advantage of the present invention to incorporate a simplified and less expensive gasification train than would otherwise be required if hydrogen were also to be produced. Also, since the hydrogen production facility 1 can be switched between the first and second feed streams the supply of hydrogen is more reliable than if such supply solely depended upon a gasifier.

Figure 5:
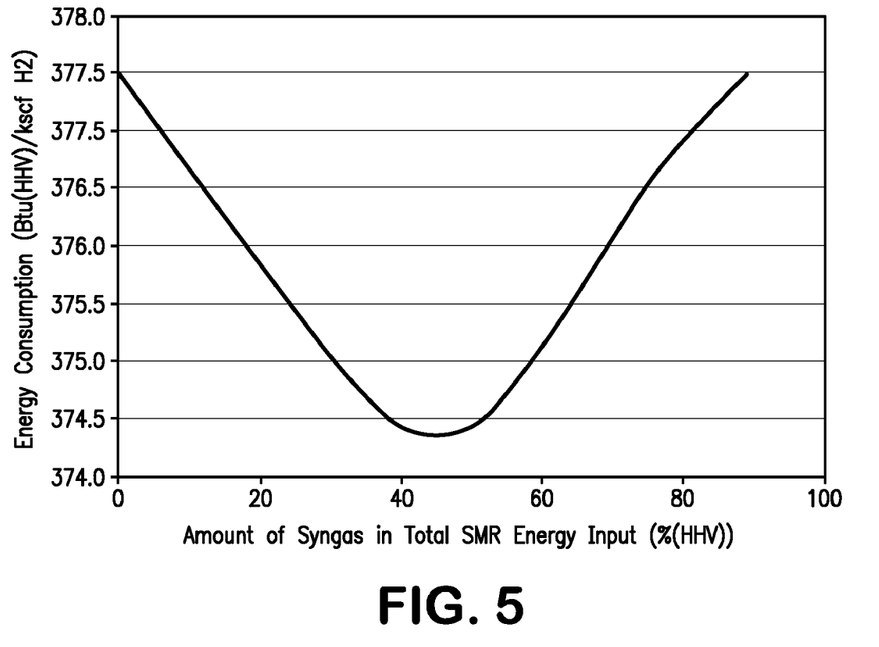
FIG. 5 is a graph of energy consumption of a steam methane reforming facility versus the content of synthesis gas in the feed on the basis of energy.

With reference to FIG. 5, the impact of the level of a synthesis gas assumed to consist of the stream 54 composition shown in Table 1 on the steam methane reformer energy intake on the net energy consumption of the hydrogen plant is shown. The zero point on abscissa represents the natural gas based conventional hydrogen plant. The net energy per standard cubic feet of hydrogen produced (the ordinate) is calculated by subtracting the enthalpy of exported steam from the total energy assumed to be derived from the natural gas and the synthesis gas intake in the hydrogen plant and dividing the result by the amount of hydrogen produced. The graph shows that when synthesis gas constitutes about 50 percent of the total energy intake of the steam methane reformer, the energy consumption is at the minimum or in other words the thermal efficiency is at the maximum.

Figure 6:
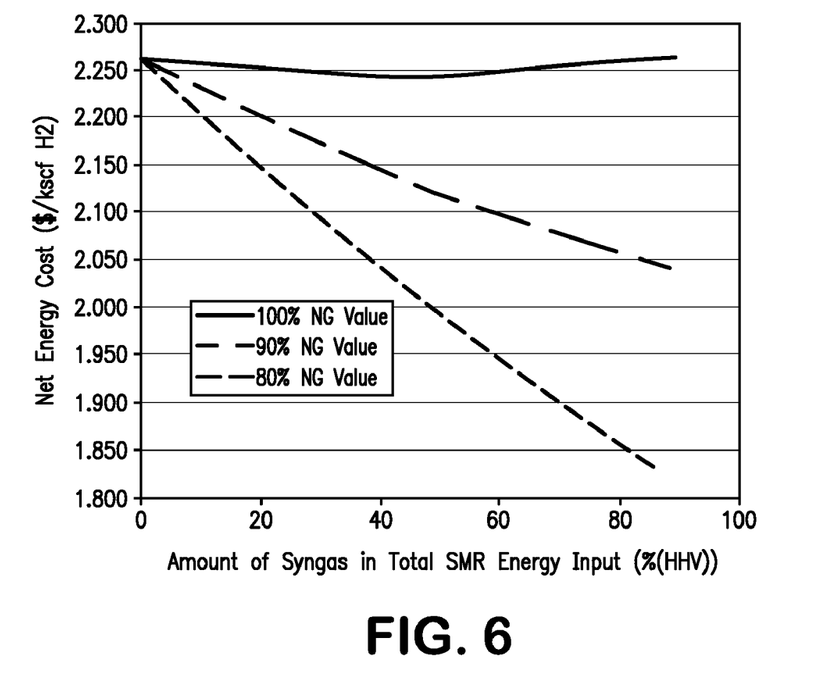
FIG. 6 is a graph of energy cost versus the amount of synthesis gas in the feed to a steam methane reformer on the basis of relative energy input by synthesis gas and the value of synthesis gas relative to natural gas.

With reference to FIG. 6, the impact of the level of the synthesis gas in the energy intake of the steam methane reformer on the net energy cost of the produced hydrogen is illustrated. In this Figure, the natural gas cost is assumed to be $6/MMBtu. The steam exported is credited at 1.35 times natural gas, i.e., the steam exported is valued at $8.10/1000 lbs. The net energy cost (the ordinate) is calculated by subtracting the steam export revenue from the total energy cost, assumed to be natural gas and synthesis gas, to make one kscf of hydrogen. The top curve in this Figure is calculated on the basis that the synthesis gas is valued at 100 percent of the natural gas value on the energy basis. As expected, the curve shows a minimum around a 50 percentage synthesis gas level corresponding to the highest thermal efficiency level shown in FIG. 5. It is possible that synthesis gas is available at a discount to the natural gas cost since synthetic natural gas contains only 80 percent of the energy contained in the synthesis gas used to produce it on the energy basis and two such curves are shown, at 90 percent and 80 percent of natural gas values. In these cases the lower cost of the synthesis gas dominates the energy cost and even when at higher than the 50 percent level of the synthesis gas where the thermal efficiency is worse, the net energy cost of hydrogen produced keeps decreasing. As such, it is possible to profitably operate a hydrogen production facility at levels of synthesis gas or other hydrogen and carbon monoxide containing gas that while not operating in the most thermally efficient manner, the hydrogen is produced at a lower cost and therefore, a higher margin.

In any embodiment of the present invention, when the second type of feed stream is used, namely the hydrogen and carbon monoxide containing stream 54 or 54', the flow rate of the superheated steam stream 68 is kept at the same level as when the first type of feed stream is used, namely that formed of natural gas, a refinery off-gas or synthetic natural gas or any mixtures thereof. Typically, this steam to carbon ratio is anywhere from 2.0 to about 4.0 for the first type of feed stream. The effect of this is to increase the steam to carbon ratio for the second type of feed stream in that less hydrocarbons are being fed to the steam methane reformer 62. In general, an increase in the steam to carbon ratio is something that would not be operationally desired in that the thermal efficiency of the hydrogen plant is reduced by the increase of more steam. Moreover, more steam increases the pressure drop across the steam methane reformer tubes that are used within steam methane reformer 62. However, the advantage here is that since there are less hydrocarbons there is going to be more of a water gas shift reaction occurring in the steam methane reformer 62 and excess steam will result in higher conversion of carbon monoxide to hydrogen in the reformer. Moreover, any steam that is not used is needed to drive high carbon monoxide conversion in the second water gas shift reactor 94. This leads to about the same hydrogen content out of such high temperature shift reactor as compared to the feed of the first type of feed stream so that the pressure swing adsorption unit 100 continues to meet the product purity and recovery requirements when the second type of feed stream is used. The limit on the maximum amount of synthesis gas that can be fed to the SMR is based on methane slip considerations. Sufficient hydrocarbons need to be fed to avoid back conversion of synthesis gas to methane as defined by equilibrium considerations.

Also, the additional steam will provide a sufficient mass flow rate through the reformer to limit the reduction in the reformer duty as compared to when the first type of feed stream is used. This has two advantages, namely it maintains the minimum make up fuel requirement and provides a good balance of high and low level heat to make steam. In addition, it makes switching from the second feed stream to the first feed stream easier and faster. The burner operation of the steam methane reformer 62 needs a certain minimum level of stable make up fuel supply for control purposes. Hence, by maintaining the reformer duty above a certain level all of the available tail gas stream 104 will be able to be used while still having some left over fuel requirement that is supplied to the make up fuel. Additionally, it also provides a sufficient mass flow rate for process gases passing through the process gas boiler 90. This keeps the operation of the process gas boiler 90 stable. If the process flow gas were to decrease substantially the temperature of stream 96 fed to shift conversion unit 94 could drop resulting in lower than necessary inlet temperatures to the high temperature shift reactor 94. A yet further advantage of the higher steam rate is that it reduces the carbon formation potential that is otherwise present due to the high carbon monoxide content within the reactant stream 64 being fed to the steam methane reformer.

Another operational consideration is that the combustion air flow rate from stream 110 is kept the same as when the first type of feed stream is used. The reformer duty of steam methane reformer 62 is lower than in the case when the first type of feed stream is used. As a result, less fuel for example from fuel stream 106 is required for firing. This results of course in a higher oxygen content in the flue gas and therefore the stack gas stream 108 being discharged. The higher air, maintains the operation of air preheater 160 about the same as when the first type of feed stream is used by keeping the air and flue gas flow rates about the same as the natural gas case. By keeping the flue gas flow rates about the same as in the natural gas case, heat exchangers in the convective section, namely the heat exchanger 134, the heat exchanger 138 and the heat exchanger 136 can be operated closer to the natural gas feed case design to minimize any equipment modifications. In addition, it makes switching from the second feed stream to the first feed stream easier and faster. Lastly, it increases the reformer duty resulting in the advantageous outlined above with respect to increasing the steam to carbon ratio to thereby limit the reduction of reformer duty.

All of this being said, the firing rate of the burners 124 and 126 are adjusted to maintain the reformer exit temperatures at the reactant side and the flue gas side essentially constant during operation of steam methane reformer 62, both when the feed is formed solely of natural gas, refinery off-gas, synthetic natural gas and blends thereof and also, when the hydrogen and carbon monoxide containing streams 54 and 54' are used. This firing rate is controlled by adjusting the flow rate of the fuel or fuels being fed to burners 124 and 126. In this regard, the reactant side temperature is the temperature of intermediate product stream 88 measured upon directly leaving reformer tubes 128 and 130 and before the process gas boiler 90. This temperature control will control methane slip in the steam methane reformer 62 to in turn maximize the hydrogen production. The reactant side temperature is preferably maintained at a temperature within a range of between about 1450° F. and about 1700° F. The flue gas side temperature is the temperature of flue gas stream 132 before entering convective section 122 and is maintained at a temperature in a range of between about 1600° F. and about 2000° F. What this flue gas temperature control does is that it, together with the maintenance of the flue gas flow rates, allows the heat exchangers in the convective section, namely the heat exchanger 134, the heat exchanger 138 and the heat exchanger 136 to be operated at substantially constant operational conditions to maintain the flow rate of the steam essentially constant during all operational conditions of the steam methane reformer 62 that are contemplated by the present invention and for purposes outline above.

Table 1 is a summary of calculated examples of process conducted in accordance with the present invention within a hydrogen production facility of the type illustrated in FIG. 1. The results show the impact of various levels of the synthesis gas as a percentage of the total energy fed to steam methane reformer 62 in which each "Case" is a simulation of the operation of hydrogen production facility 1 with an increasing level of synthesis gas. For all of such Cases the hydrogen production is kept constant at 100 MMSCFD. The steam available for export is kept at or below the base Case 1 in which the feed to the steam methane reformer 62 consists of natural gas only. Furthermore, valve 86 is closed and value 84 is set in an open position such that hydrogen and carbon monoxide containing stream 54 is introduced into the sulfur guard bed 76 along with the hydrotreated stream 73. In this regard, in the table and in the discussion thereof, the term, "syngas" means hydrogen and carbon monoxide containing stream 54, "flue gas" means flue gas stream 108.

TABLE 1

| | Case Number | | | | |
|---|---|---|---|---|---|
| | 1 | 2 | 3 | 4 | 5 |
| Volumetric % of Syngas in Total SMR Feed | 0 | 56 | 71 | 88 | 95 |
| HHV % of Syngas in Total SMR Feed | 0 | 36 | 52 | 76 | 88 |
| Hydrogen Product (MMSCFD) | 100 | 100 | 100 | 100 | 100 |
| Steam Export (kpph) | 155 | 155 | 155 | 129 | 126 |
| Net Energy (after steam credit) (Btu(HHV)/scf) | 377.5 | 374.6 | 374.5 | 376.7 | 377.5 |
| S:C Ratio (w/o CO) | 2.8 | 3.2 | 3.6 | 4.8 | 5.6 |
| S:C Ratio (with CO) | 2.8 | 2.7 | 2.7 | 2.9 | 3.0 |
| O2 in Flue Gas (% dry) | 1.4 | 3.5 | 4.6 | 4.9 | 5.8 |

TABLE 1-continued

| | Case Number | | | | |
|---|---|---|---|---|---|
| | 1 | 2 | 3 | 4 | 5 |
| Reformer Absorbed Duty (MMBtu/hr) | 389 | 314 | 282 | 234 | 211 |
| Syngas HHV (Btu/scf) | 442 | 442 | 442 | 442 | 442 |

| Stream 54 Composition | |
|---|---|
| H2 | 0.603 |
| CO | 0.197 |
| CO2 | 0.007 |
| CH4 | 0.180 |

The first row of the Table 1 shows the amount of synthesis gas provided by hydrogen and carbon monoxide containing stream 54 as a percentage of the total feed of synthesis gas and natural gas to the steam methane reformer 62 on the volumetric basis. Similarly the second row shows the amount of synthesis gas provided by hydrogen and carbon monoxide containing stream 54 as a percentage of the total energy feed to the steam methane reformer 62 on an energy basis (where HHV is the high heating value of the feeds.) The assumed composition of stream 54 is also shown. For such purposes it was assumed that the gasifier is a two stage entrained flow slurry fed unit and the carbonaceous feed to the gasifier is a blend of refinery off-gas and petcoke.

As is apparent in the chart, the duty of steam methane reformer 62 decreases as can be seen in row 9 (reformer adsorbed duty). In this regard, the fifth row shows the net energy consumption per standard cubic feet of hydrogen produced after the steam export credit. This number is a good proxy for the thermal efficiency of the plant and hence, a good indicator of the operating cost of the hydrogen production. As seen from Table 1 and as shown graphically in FIG. 5, the energy consumption decreases as the amount of synthesis gas increases up to a point of about 50 percent synthesis gas on an energy basis (row 2 of Table 2). When amount of synthesis gas is increased beyond that optimum point the energy consumption begins to increase indicating a decrease in thermal efficiency.

The steam generated in the hydrogen production facility 1 (both consumed within steam methane reformer 62 and available for export in export steam stream 146) also impacts the thermal efficiency. It should be noted that the optimum synthesis gas amount in the total energy intake for a particular hydrogen production facility will be dependent on the specifics of the various components of the facility, for example, the steam methane reformer 62, and the energy pricing. In this regard, when the synthesis gas is available at a discount compared to natural gas on the energy (HHV) basis, it is desirable to maximize the synthesis gas use in the hydrogen plant as shown in FIG. 6. In such a case the upper limit to the amount of the synthesis gas used in the hydrogen production facility as feed to the steam methane reformer 62 will be set from practical limitations such as the stability of the steam methane reformer 62, operation of the furnace section 120 of the steam methane reformer 62 with very little endothermic reaction and etc.

As shown in Table 1, the steam to carbon ratio and excess oxygen in the flue gas stream 132 increases with the increase in the synthesis gas use in the steam methane reformer 62. Rows 6 and 7 show the steam to carbon ratios calculated without and with carbon monoxide in the carbon count. The steam to carbon ratio with carbon monoxide stays relatively constant in these five cases. Finally the ninth row in the Table 1 shows that as the level of the synthesis gas increases the absorbed duty of the reformer (heat that is transferred through the tube walls from the combustion side to the process side) decreases. Now if the steam methane reformer 62 is designed for 100 percent natural gas feed (Case 1 in the Table 1), the steam methane reformer tubes will have sufficient surface area to be able to process more feed as indicated in the reduction absorbed duty and therefore, it is possible to increase hydrogen production with the use of the hydrogen and carbon monoxide containing gas 54 even beyond the production indicated in the table. This potential to increase the hydrogen production from given equipment is a significant advantage of the use of the synthesis gas in the hydrogen plant. The higher heating value and the composition of the synthesis gas are also provided in the Table 1.

The following Tables, 2, 3 and 4 represent simulations of stream summaries that were used in the calculations shown in Table 1. Specifically, Table 2 is Case 1, the base case in which hydrogen and carbon monoxide containing stream 54 was not added. Tables 3 and 4 show the effect of an increase flow of stream 54 or in other words, the use of the hydrogen and carbon monoxide containing gas stream 54.

TABLE 2

Case 1

| | Stream No. (FIG. 1) | | | | | |
|---|---|---|---|---|---|---|
| | 110 | 132 | 72 | 73 | 106 | 66 |
| Vapor Fraction | 1 | 1 | 1 | 1 | 1 | 1 |
| Temperature [F.] | 626 | 1804 | 60 | 716 | 60 | 707 |
| Pressure [psia] | 14.8 | 14.7 | 512.0 | 507.6 | 512.0 | 459.0 |
| Molar Flow [MMSCFD] | 182.5 | 230.6 | 39.2 | 40.2 | 3.0 | 40.2 |
| Mass Flow [lb/hr] | 572,820 | 738,615 | 73,470 | 73,701 | 5,623 | 73,701 |
| Mole Frac (H2O) | 0.0340 | 0.1947 | 0.0000 | 0.0000 | 0.0000 | 0.0000 |
| Mole Frac (Hydrogen) | 0.0000 | 0.0000 | 0.0000 | 0.0259 | 0.0000 | 0.0259 |
| Mole Frac (Oxygen) | 0.2024 | 0.0116 | 0.0000 | 0.0000 | 0.0000 | 0.0000 |
| Mole Frac (Nitrogen) | 0.7548 | 0.6006 | 0.0184 | 0.0179 | 0.0184 | 0.0179 |
| Mole Frac (Argon) | 0.0089 | 0.0070 | 0.0000 | 0.0000 | 0.0000 | 0.0000 |
| Mole Frac (CO) | 0.0000 | 0.0000 | 0.0000 | 0.0000 | 0.0000 | 0.0000 |
| Mole Frac (CO2) | 0.0000 | 0.1860 | 0.0107 | 0.0104 | 0.0107 | 0.0104 |
| Mole Frac (Methane) | 0.0000 | 0.0000 | 0.9428 | 0.9184 | 0.9428 | 0.9184 |
| Mole Frac (Ethane) | 0.0000 | 0.0000 | 0.0229 | 0.0223 | 0.0229 | 0.0223 |
| Mole Frac (Propane) | 0.0000 | 0.0000 | 0.0034 | 0.0033 | 0.0034 | 0.0033 |
| Mole Frac (n-Butane) | 0.0000 | 0.0000 | 0.0006 | 0.0006 | 0.0006 | 0.0006 |
| Mole Frac (i-Butane) | 0.0000 | 0.0000 | 0.0005 | 0.0005 | 0.0005 | 0.0005 |
| Mole Frac (i-Pentane) | 0.0000 | 0.0000 | 0.0002 | 0.0002 | 0.0002 | 0.0002 |
| Mole Frac (n-Pentane) | 0.0000 | 0.0000 | 0.0002 | 0.0002 | 0.0002 | 0.0002 |
| Mole Frac (n-Hexane) | 0.0000 | 0.0000 | 0.0003 | 0.0003 | 0.0003 | 0.0003 |

| | Stream No. (FIG. 1) | | | | | |
|---|---|---|---|---|---|---|
| | 68 | 64 | 88 | 96 | 98 | 104 |
| Vapor Fraction | 1 | 1 | 1 | 1 | 1 | 1 |
| Temperature [F.] | 709 | 1112 | 1571 | 626 | 101 | 95 |
| Pressure [psia] | 459.0 | 444.5 | 408.3 | 403.9 | 376.4 | 18.9 |
| Molar Flow [MMSCFD] | 110.5 | 150.8 | 210.6 | 210.6 | 155.1 | 54.1 |
| Mass Flow [lb/hr] | 218,641 | 292,342 | 292,344 | 292,344 | 182,595 | 160,179 |
| Mole Frac (H2O) | 1.0000 | 0.7331 | 0.3310 | 0.3310 | 0.0030 | 0.0087 |
| Mole Frac (Hydrogen) | 0.0000 | 0.0069 | 0.4761 | 0.4761 | 0.7355 | 0.2424 |
| Mole Frac (Oxygen) | 0.0000 | 0.0000 | 0.0000 | 0.0000 | 0.0000 | 0.0000 |
| Mole Frac (Nitrogen) | 0.0000 | 0.0048 | 0.0034 | 0.0034 | 0.0046 | 0.0130 |
| Mole Frac (Argon) | 0.0000 | 0.0000 | 0.0000 | 0.0000 | 0.0000 | 0.0000 |
| Mole Frac (CO) | 0.0000 | 0.0000 | 0.0900 | 0.0900 | 0.0328 | 0.0941 |
| Mole Frac (CO2) | 0.0000 | 0.0028 | 0.0539 | 0.0539 | 0.1622 | 0.4649 |
| Mole Frac (Methane) | 0.0000 | 0.2451 | 0.0455 | 0.0455 | 0.0617 | 0.1769 |
| Mole Frac (Ethane) | 0.0000 | 0.0060 | 0.0000 | 0.0000 | 0.0000 | 0.0000 |
| Mole Frac (Propane) | 0.0000 | 0.0009 | 0.0000 | 0.0000 | 0.0000 | 0.0000 |
| Mole Frac (n-Butane) | 0.0000 | 0.0002 | 0.0000 | 0.0000 | 0.0000 | 0.0000 |
| Mole Frac (i-Butane) | 0.0000 | 0.0001 | 0.0000 | 0.0000 | 0.0000 | 0.0000 |
| Mole Frac (i-Pentane) | 0.0000 | 0.0001 | 0.0000 | 0.0000 | 0.0000 | 0.0000 |
| Mole Frac (n-Pentane) | 0.0000 | 0.0001 | 0.0000 | 0.0000 | 0.0000 | 0.0000 |
| Mole Frac (n-Hexane) | 0.0000 | 0.0001 | 0.0000 | 0.0000 | 0.0000 | 0.0000 |

TABLE 3

Case 3

Stream No. (FIG. 1)

| | 110 | 132 | 54 | 72 | 73 | 106 | 66 |
|---|---|---|---|---|---|---|---|
| Vapor Fraction | 1 | 1 | 1 | 1 | 1 | 1 | 1 |
| Temperature [F.] | 626 | 1806 | 122 | 60 | 716 | 60 | 707 |
| Pressure [psia] | 14.8 | 14.7 | 583.0 | 520.0 | 507.6 | 520.0 | 459.0 |
| Molar Flow [MMSCFD] | 183.2 | 228.3 | 50.0 | 19.3 | 69.3 | 0.9 | 69.3 |
| Mass Flow [lb/hr] | 574,949 | 735,003 | 56,297 | 36,173 | 92,470 | 1,593 | 92,470 |
| Mole Frac ($H_2O$) | 0.0340 | 0.1709 | 0.0020 | 0.0000 | 0.0014 | 0.0000 | 0.0014 |
| Mole Frac (Hydrogen) | 0.0000 | 0.0000 | 0.6034 | 0.0000 | 0.4353 | 0.0000 | 0.4353 |
| Mole Frac (Oxygen) | 0.2024 | 0.0388 | 0.0000 | 0.0000 | 0.0000 | 0.0000 | 0.0000 |
| Mole Frac (Nitrogen) | 0.7548 | 0.6094 | 0.0100 | 0.0184 | 0.0123 | 0.0184 | 0.0123 |
| Mole Frac (Argon) | 0.0089 | 0.0071 | 0.0000 | 0.0000 | 0.0000 | 0.0000 | 0.0000 |
| Mole Frac (CO) | 0.0000 | 0.0000 | 0.1968 | 0.0000 | 0.1420 | 0.0000 | 0.1420 |
| Mole Frac ($CO_2$) | 0.0000 | 0.1739 | 0.0070 | 0.0107 | 0.0080 | 0.0107 | 0.0080 |
| Mole Frac (Methane) | 0.0000 | 0.0000 | 0.1808 | 0.9428 | 0.3930 | 0.9428 | 0.3930 |
| Mole Frac (Ethane) | 0.0000 | 0.0000 | 0.0000 | 0.0229 | 0.0064 | 0.0229 | 0.0064 |
| Mole Frac (Propane) | 0.0000 | 0.0000 | 0.0000 | 0.0034 | 0.0009 | 0.0034 | 0.0009 |
| Mole Frac (n-Butane) | 0.0000 | 0.0000 | 0.0000 | 0.0006 | 0.0002 | 0.0006 | 0.0002 |
| Mole Frac (i-Butane) | 0.0000 | 0.0000 | 0.0000 | 0.0005 | 0.0001 | 0.0005 | 0.0001 |
| Mole Frac (i-Pentane) | 0.0000 | 0.0000 | 0.0000 | 0.0002 | 0.0001 | 0.0002 | 0.0001 |
| Mole Frac (n-Pentane) | 0.0000 | 0.0000 | 0.0000 | 0.0002 | 0.0001 | 0.0002 | 0.0001 |
| Mole Frac (n-Hexane) | 0.0000 | 0.0000 | 0.0000 | 0.0003 | 0.0001 | 0.0003 | 0.0001 |

Stream Number (FIG. 1)

| | 68 | 64 | 88 | 96 | 98 | 104 |
|---|---|---|---|---|---|---|
| Vapor Fraction | 1 | 1 | 1 | 1 | 1 | 1 |
| Temperature [F.] | 709 | 1112 | 1571 | 626 | 101 | 95 |
| Pressure [psia] | 459.0 | 444.5 | 408.3 | 403.9 | 376.4 | 18.9 |
| Molar Flow [MMSCFD] | 102.5 | 171.8 | 211.2 | 211.2 | 153.3 | 53.1 |
| Mass Flow [lb/hr] | 202,786 | 295,256 | 295,258 | 295,258 | 180,712 | 158,466 |
| Mole Frac ($H_2O$) | 1.0000 | 0.5972 | 0.3408 | 0.3408 | 0.0030 | 0.0088 |
| Mole Frac (Hydrogen) | 0.0000 | 0.1756 | 0.4711 | 0.4711 | 0.7382 | 0.2450 |
| Mole Frac (Oxygen) | 0.0000 | 0.0000 | 0.0000 | 0.0000 | 0.0000 | 0.0000 |
| Mole Frac (Nitrogen) | 0.0000 | 0.0050 | 0.0040 | 0.0040 | 0.0056 | 0.0156 |
| Mole Frac (Argon) | 0.0000 | 0.0000 | 0.0000 | 0.0000 | 0.0000 | 0.0000 |
| Mole Frac (CO) | 0.0000 | 0.0573 | 0.0877 | 0.0877 | 0.0313 | 0.0904 |
| Mole Frac ($CO_2$) | 0.0000 | 0.0032 | 0.0547 | 0.0547 | 0.1644 | 0.4744 |
| Mole Frac (Methane) | 0.0000 | 0.1585 | 0.0417 | 0.0417 | 0.0574 | 0.1657 |
| Mole Frac (Ethane) | 0.0000 | 0.0026 | 0.0000 | 0.0000 | 0.0000 | 0.0000 |
| Mole Frac (Propane) | 0.0000 | 0.0004 | 0.0000 | 0.0000 | 0.0000 | 0.0000 |
| Mole Frac (n-Butane) | 0.0000 | 0.0001 | 0.0000 | 0.0000 | 0.0000 | 0.0000 |
| Mole Frac (i-Butane) | 0.0000 | 0.0001 | 0.0000 | 0.0000 | 0.0000 | 0.0000 |
| Mole Frac (i-Pentane) | 0.0000 | 0.0000 | 0.0000 | 0.0000 | 0.0000 | 0.0000 |
| Mole Frac (n-Pentane) | 0.0000 | 0.0000 | 0.0000 | 0.0000 | 0.0000 | 0.0000 |
| Mole Frac (n-Hexane) | 0.0000 | 0.0000 | 0.0000 | 0.0000 | 0.0000 | 0.0000 |

TABLE 4

Case 5

Stream No. (FIG. 1)

| | 110 | 132 | 54 | 72 | 73 | 106 | 66 |
|---|---|---|---|---|---|---|---|
| Vapor Fraction | 1 | 1 | 1 | 1 | 1 | 1 | 1 |
| Temperature [F.] | 626 | 1805 | 122 | 60 | 716 | 60 | 707 |
| Pressure [psia] | 14.8 | 14.7 | 583.0 | 520.0 | 507.6 | 520.0 | 459.0 |

TABLE 4-continued

Case 5

| | | | | | | | |
|---|---|---|---|---|---|---|---|
| Molar Flow [MMSCFD] | 164.2 | 207.1 | 83.5 | 4.0 | 87.5 | 0.9 | 87.5 |
| Mass Flow [lb/hr] | 515,324 | 671,013 | 94,016 | 7,497 | 101,513 | 1,593 | 101,513 |
| Mole Frac (H2O) | 0.0340 | 0.1633 | 0.0020 | | 0.0019 | 0.0000 | 0.0019 |
| Mole Frac (Hydrogen) | 0.0000 | 0.0000 | 0.6034 | 0.0000 | 0.5758 | 0.0000 | 0.5758 |
| Mole Frac (Oxygen) | 0.2024 | 0.0483 | 0.0000 | 0.0000 | 0.0000 | 0.0000 | 0.0000 |
| Mole Frac (Nitrogen) | 0.7548 | 0.6028 | 0.0100 | 0.0184 | 0.0104 | 0.0184 | 0.0104 |
| Mole Frac (Argon) | 0.0089 | 0.0070 | 0.0000 | 0.0000 | 0.0000 | 0.0000 | 0.0000 |
| Mole Frac (CO) | 0.0000 | 0.0000 | 0.1968 | 0.0000 | 0.1878 | 0.0000 | 0.1878 |
| Mole Frac (CO2) | 0.0000 | 0.1786 | 0.0070 | 0.0107 | 0.0072 | 0.0107 | 0.0072 |
| Mole Frac (Methane) | 0.0000 | 0.0000 | 0.1808 | 0.9428 | 0.2156 | 0.9428 | 0.2156 |
| Mole Frac (Ethane) | 0.0000 | 0.0000 | 0.0000 | 0.0229 | 0.0010 | 0.0229 | 0.0010 |
| Mole Frac (Propane) | 0.0000 | 0.0000 | 0.0000 | 0.0034 | 0.0002 | 0.0034 | 0.0002 |
| Mole Frac (n-Butane) | 0.0000 | 0.0000 | 0.0000 | 0.0006 | 0.0000 | 0.0006 | 0.0000 |
| Mole Frac (i-Butane) | 0.0000 | 0.0000 | 0.0000 | 0.0005 | 0.0000 | 0.0005 | 0.0000 |
| Mole Frac (i-Pentane) | 0.0000 | 0.0000 | 0.0000 | 0.0002 | 0.0000 | 0.0002 | 0.0000 |
| Mole Frac (n-Pentane) | 0.0000 | 0.0000 | 0.0000 | 0.0002 | 0.0000 | 0.0002 | 0.0000 |
| Mole Frac (n-Hexane) | 0.0000 | 0.0000 | 0.0000 | 0.0003 | 0.0000 | 0.0003 | 0.0000 |

Stream No. (FIG. 1)

| | 68 | 64 | 88 | 96 | 98 | 104 |
|---|---|---|---|---|---|---|
| Vapor Fraction | 1 | 1 | 1 | 1 | 1 | 1 |
| Temperature [F.] | 709 | 1112 | 1571 | 626 | 101 | 95 |
| Pressure [psia] | 459.0 | 444.5 | 408.3 | 403.9 | 376.4 | 18.9 |
| Molar Flow [MMSCFD] | 107.7 | 195.2 | 220.3 | 220.3 | 150.6 | 50.5 |
| Mass Flow [lb/hr] | 213,008 | 314,520 | 314,521 | 314,521 | 176,335 | 154,101 |
| Mole Frac (H2O) | 1.0000 | 0.5526 | 0.3789 | 0.3789 | 0.0031 | 0.0091 |
| Mole Frac (Hydrogen) | 0.0000 | 0.2581 | 0.4528 | 0.4528 | 0.7511 | 0.2577 |
| Mole Frac (Oxygen) | 0.0000 | 0.0000 | 0.0000 | 0.0000 | 0.0000 | 0.0000 |
| Mole Frac (Nitrogen) | 0.0000 | 0.0047 | 0.0041 | 0.0041 | 0.0060 | 0.0175 |
| Mole Frac (Argon) | 0.0000 | 0.0000 | 0.0000 | 0.0000 | 0.0000 | 0.0000 |
| Mole Frac (CO) | 0.0000 | 0.0842 | 0.0782 | 0.0782 | 0.0258 | 0.0769 |
| Mole Frac (CO2) | 0.0000 | 0.0032 | 0.0564 | 0.0564 | 0.1706 | 0.5090 |
| Mole Frac (Methane) | 0.0000 | 0.0967 | 0.0297 | 0.0297 | 0.0435 | 0.1297 |
| Mole Frac (Ethane) | 0.0000 | 0.0005 | 0.0000 | 0.0000 | 0.0000 | 0.0000 |

Table 5 below shows the impact of sourcing syngas from different locations in the gasification plant on the operation of hydrogen plant. Three cases are described, namely, after the gasifier as illustrated in FIG. 4 (Case 6), after the partial shift reactor (Case 7), and after the partial shift and carbon dioxide removal unit as illustrated in FIG. 1 (Case 8). Case 8 is similar to cases 1 through 5 described earlier. However, the composition of the synthesis gas used in the Cases 1 through 5 is different (has higher methane content) than the syngas composition used for Case 8. This is because the gasifier feed was limited to petroleum coke—refinery fuel gas was not included in the process. Again, in Table 5, the term "syngas" means a hydrogen and carbon monoxide containing gas stream, for example, hydrogen and carbon monoxide containing gas stream 54' with respect to Case 6. In Case 7, "syngas" is obtained from stream 40 illustrated in FIG. 2.

TABLE 5

| | Case | | |
|---|---|---|---|
| | 6 | 7 | 8 |
| Source of Syngas (Gasifier feed consists of petcoke only) | Post Gasifier | Post Shift Reactor | Post Shift Reactor and CO2 Removal |
| Syngas (MMSCFD) | 77 | 120 | 65 |
| Natural Gas Feed (MMSCFD) | 19.5 | 15.5 | 17.4 |
| Natural Gas Fuel (MMSCFD) | 1.0 | 4.1 | 1.1 |
| Hydrogen Product (MMSCFD) | 100 | 100 | 100 |
| Steam Export (kpph) | 181 | 244 | 97 |
| Net Energy (after steam credit) (Btu(HHV)/scf) | 382.2 | 385.7 | 379.3 |
| S:C Ratio (w/o CO) | 5.6 | 5.6 | 5.6 |
| S:C Ratio (with CO) | 1.9 | 2.9 | 3.2 |
| O2 in Flue Gas (% dry) | 3.5 | 2.9 | 3.6 |

TABLE 5-continued

| | Case | | |
|---|---|---|---|
| | 6 | 7 | 8 |
| Reformer Absorbed Duty (MMBtu/hr) | 240 | 271 | 226 |
| Syngas HHV (Btu/scf) | 302 | 223 | 344 |
| Syngas Composition | | | |
| H2 | 0.271 | 0.462 | 0.711 |
| CO | 0.559 | 0.149 | 0.230 |
| CO2 | 0.126 | 0.355 | 0.008 |
| CH4 | 0.034 | 0.025 | 0.039 |

The second row in Table 5 shows the amount of the synthesis gas fed to the steam methane reformer 62 to make 100 MMSCFD hydrogen. The third row shows the natural gas used as feed whereas the fourth row shows the natural gas used as make up fuel to fire the burners in the steam methane reformer 62. The steam available for export is shown in sixth row.

Case 7 generates maximum amount of steam because of the high amount of carbon dioxide in the synthesis gas feed that needs to be heated in the furnace section of the steam methane reformer and cooled subsequently. The seventh row shows the net energy consumption. Case 8 where the synthesis gas is taken after the carbon dioxide removal has the least energy consumption. All three cases have the same steam to carbon ratio when calculated without counting carbon monoxide as carbon. The ninth row shows the steam to carbon ratio when carbon monoxide is included in the carbon count. Case 1 has the least steam to carbon ratio as it has the highest carbon monoxide content in the synthesis gas fed to the steam methane reformer. The tenth row shows the oxygen content in the flue gas on a dry basis. The reformer absorbed duty is shown next. Case 7 has the highest duty among the three cases as this case has a high carbon dioxide content in the synthesis gas fed to the steam methane reformer that needs to be heated up along with other components. The heat absorbed from the combustion gases by the process stream is shown in the eleventh row. The synthesis gas composition is shown in the twelfth row.

Table 6 is a stream summary of Case 6 which is the embodiment shown in FIG. 4.

TABLE 6

| | Case 6: | | | | | | |
|---|---|---|---|---|---|---|---|
| | Stream No. (FIG. 4) | | | | | | |
| | 110 | 132 | 54' | 72 | 73 | 106 | 66 |
| Vapor Fraction | 1 | 1 | 1 | 1 | 1 | 1 | 1 |
| Temperature [F.] | 626 | 1806 | 122 | 60 | 716 | 60 | 707 |
| Pressure [psia] | 14.8 | 14.7 | 583.0 | 520.0 | 507.6 | 520.0 | 459.0 |
| Molar Flow [MMSCFD] | 177.1 | 255.4 | 77.0 | 19.5 | 96.5 | 1.0 | 96.5 |
| Mass Flow [lb/hr] | 555,958 | 885,860 | 190,704 | 36,548 | 227,251 | 1,912 | 227,251 |
| Mole Frac (H2O) | 0.0340 | 0.1386 | 0.0020 | 0.0000 | 0.0016 | 0.0000 | 0.0016 |
| Mole Frac (Hydrogen) | 0.0000 | 0.0000 | 0.2710 | 0.0000 | 0.2162 | 0.0000 | 0.2162 |
| Mole Frac (Oxygen) | 0.2024 | 0.0299 | 0.0000 | 0.0000 | 0.0000 | 0.0000 | 0.0000 |
| Mole Frac (Nitrogen) | 0.7548 | 0.5272 | 0.0080 | 0.0184 | 0.0101 | 0.0184 | 0.0101 |
| Mole Frac (Argon) | 0.0089 | 0.0062 | 0.0000 | 0.0000 | 0.0000 | 0.0000 | 0.0000 |
| Mole Frac (CO) | 0.0000 | 0.0000 | 0.5590 | 0.0000 | 0.4460 | 0.0000 | 0.4460 |
| Mole Frac (CO2) | 0.0000 | 0.2981 | 0.1260 | 0.0107 | 0.1027 | 0.0107 | 0.1027 |
| Mole Frac (Methane) | 0.0000 | 0.0000 | 0.0340 | 0.9428 | 0.2176 | 0.9428 | 0.2176 |
| Mole Frac (Ethane) | 0.0000 | 0.0000 | 0.0000 | 0.0229 | 0.0046 | 0.0229 | 0.0046 |
| Mole Frac (Propane) | 0.0000 | 0.0000 | 0.0000 | 0.0034 | 0.0007 | 0.0034 | 0.0007 |
| Mole Frac (n-Butane) | 0.0000 | 0.0000 | 0.0000 | 0.0006 | 0.0001 | 0.0006 | 0.0001 |
| Mole Frac (i-Butane) | 0.0000 | 0.0000 | 0.0000 | 0.0005 | 0.0001 | 0.0005 | 0.0001 |
| Mole Frac (i-Pentane) | 0.0000 | 0.0000 | 0.0000 | 0.0002 | 0.0000 | 0.0002 | 0.0000 |
| Mole Frac (n-Pentane) | 0.0000 | 0.0000 | 0.0000 | 0.0002 | 0.0000 | 0.0002 | 0.0000 |

TABLE 6-continued

| | Case 6: | | | | | | |
|---|---|---|---|---|---|---|---|
| Mole Frac (n-Hexane) | 0.0000 | 0.0000 | 0.0000 | 0.0003 | 0.0001 | 0.0003 | 0.0001 |

| | Stream No. (FIG. 4) | | | | | |
|---|---|---|---|---|---|---|
| | 68 | 64 | 88 | 96 | 98 | 104 |
| Vapor Fraction | 1 | 1 | 1 | 1 | 1 | 1 |
| Temperature [F.] | 709 | 1112 | 1571 | 600 | 101 | 95 |
| Pressure [psia] | 459.0 | 444.5 | 408.3 | 403.9 | 376.4 | 18.9 |
| Molar Flow [MMSCFD] | 125.3 | 221.8 | 252.5 | 252.5 | 189.5 | 89.6 |
| Mass Flow [lb/hr] | 247,848 | 475,100 | 475,100 | 475,100 | 350,191 | 327,995 |
| Mole Frac (H2O) | 1.0000 | 0.5656 | 0.3497 | 0.3497 | 0.0032 | 0.0067 |
| Mole Frac (Hydrogen) | 0.0000 | 0.0941 | 0.3486 | 0.3486 | 0.5955 | 0.1448 |
| Mole Frac (Oxygen) | 0.0000 | 0.0000 | 0.0000 | 0.0000 | 0.0000 | 0.0000 |
| Mole Frac (Nitrogen) | 0.0000 | 0.0044 | 0.0039 | 0.0039 | 0.0051 | 0.0106 |
| Mole Frac (Argon) | 0.0000 | 0.0000 | 0.0000 | 0.0000 | 0.0000 | 0.0000 |
| Mole Frac (CO) | 0.0000 | 0.1941 | 0.1451 | 0.1451 | 0.0623 | 0.1317 |
| Mole Frac (CO2) | 0.0000 | 0.0447 | 0.1254 | 0.1254 | 0.2976 | 0.6293 |
| Mole Frac (Methane) | 0.0000 | 0.0947 | 0.0273 | 0.0273 | 0.0363 | 0.0768 |
| Mole Frac (Ethane) | 0.0000 | 0.0020 | 0.0000 | 0.0000 | 0.0000 | 0.0000 |
| Mole Frac (Propane) | 0.0000 | 0.0003 | 0.0000 | 0.0000 | 0.0000 | 0.0000 |
| Mole Frac (n-Butane) | 0.0000 | 0.0001 | 0.0000 | 0.0000 | 0.0000 | 0.0000 |
| Mole Frac (i-Butane) | 0.0000 | 0.0000 | 0.0000 | 0.0000 | 0.0000 | 0.0000 |
| Mole Frac (i-Pentane) | 0.0000 | 0.0000 | 0.0000 | 0.0000 | 0.0000 | 0.0000 |
| Mole Frac (n-Pentane) | 0.0000 | 0.0000 | 0.0000 | 0.0000 | 0.0000 | 0.0000 |
| Mole Frac (n-Hexane) | 0.0000 | 0.0000 | 0.0000 | 0.0000 | 0.0000 | 0.0000 |

While the present invention has been described with reference to preferred embodiments, as will occur to those skilled in the art, numerous changes, additions and modifications can be made without departing from the spirit and scope of the present invention as set forth in the appended claims.

We claim:

1. A method of producing a hydrogen product stream comprising:
   combining a steam stream and a hydrocarbon containing stream to produce a reactant stream and reacting hydrocarbons with steam contained in the reactant stream in a steam methane reformer to produce an intermediate product stream;
   alternatively forming the hydrocarbon stream from a first feed stream and a second feed stream without substantially changing flow rate of the steam stream and while maintaining reformer exit temperatures at both the reactant and flue gas side essentially constant and flow rate of the flue gas essentially constant;
   the first feed stream being made up of at least one of natural gas, refinery off-gas, naphtha and synthetic natural gas;
   the second feed stream being made up of a hydrogen and carbon monoxide containing gas and at least one of the natural gas, the refinery off-gas, naphtha and synthetic natural gas;
   utilizing a synthesis gas stream formed by a gasifier for the production of the hydrogen and carbon monoxide containing gas;
   subjecting the intermediate product stream to a water gas shift reaction to produce a shifted stream; and
   separating the hydrogen from the shifted stream in a pressure swing adsorption unit to produce the hydrogen product stream.

2. The method of claim 1, wherein the part of a synthesis gas stream, formed by the gasifier can also be utilized in production of the synthetic natural gas.

3. The method of claim 2, wherein:
   the water gas shift reaction to which the intermediate product stream is subjected is a second water gas shift reaction; and
   the synthesis gas stream is utilized to produce the synthetic natural gas and the hydrogen and carbon monoxide containing gas by subjecting the synthesis gas stream to a first water gas shift reaction to produce the partially shifted gas stream, subjecting the partially shifted gas stream to acid gas removal to form a purified partially shifted gas stream, forming the hydrogen and carbon monoxide containing gas from a portion of the purified partially shifted gas stream and subjecting a remaining portion of the purified partially shifted gas stream to methanation to produce the synthetic natural gas.

4. The method of claim 3, wherein:
   the first feed stream is formed from at least one of a natural gas stream containing the natural gas, a refinery off-gas stream containing the refinery off-gas and a synthetic natural gas stream containing at least part of the synthetic natural gas produced by the methanation;
   the first feed stream is introduced into a hydrotreater to convert any sulfur species within the first feed stream to hydrogen sulfide and then into an adsorbent bed to adsorb the hydrogen sulfide; and
   the second feed stream is formed by passing the at least one of the natural gas stream, the refinery off-gas stream and the synthetic natural gas stream into the hydrotreater and then into the zinc oxide bed and combining the portion of the purified partially shifted gas stream therewith, either prior to or after the adsorbent bed.

5. The method of claim 2, wherein:
   the water gas shift reaction to which the intermediate product stream is subjected is a second water gas shift reactor; and
   the synthesis gas stream is utilized to produce the synthetic natural gas and the hydrogen and carbon monoxide containing gas by forming the hydrogen and carbon monoxide containing stream from part of the synthesis gas stream and by subjecting a remaining part of the synthesis gas stream to a first water gas shift reaction to produce a partially shifted gas stream, subjecting the partially shifted gas stream to acid gas removal to form a purified partially shifted gas stream and subjecting the purified partially shifted gas stream to methanation to produce the synthetic natural gas.

6. The method of claim 5, wherein:
the first feed stream is formed from at least one of a natural gas stream containing the natural gas, a refinery off-gas stream containing the refinery off-gas and a synthetic natural gas stream containing at least part of the synthetic natural gas produced by the methanation;
the first feed stream is introduced into a hydrotreater to convert any sulfur species within the first feed stream to hydrogen sulfide and then into an adsorbent bed to adsorb the hydrogen sulfide; and
the second feed stream is formed by passing the at least one of the natural gas stream, the refinery off-gas stream and the synthetic natural gas stream into the hydrotreater and then combining the part of the synthesis gas stream therewith to form a combined stream and then passing the combined stream into the adsorbent bed.

7. The method of claim 1, wherein:
separating the hydrogen from the shifted stream in the pressure swing adsorption unit also produces a tail gas stream; and
at least part of the tail gas stream is used as part of a fuel supplied to burners firing into a furnace section of the steam methane reformer.

8. The method of claim 7, wherein:
the part of the tail gas stream is used as part of the fuel supplied to the burners; and
another part of the tail gas stream is used as a fuel in duct burners firing into a convective section of the steam methane reformer.

9. The method of claim 1, wherein the flow rate of the steam is sufficient to produce a steam to carbon molar ratio of between about 2.0 and about 4.0 for the first feed stream.

10. The method of claim 1, wherein the reformer exit temperature at the flue side is between about 1600° F. and about 2000° F. and at the reactant side is between about 1450° F. and about 1700° F.

11. The method of claim 1, wherein the partially shifted synthesis gas stream has a hydrogen to carbon monoxide molar ratio of between about 2.8 and about 3.3.

12. The method of claim 4 or claim 6, wherein:
the flow rate of the steam is sufficient to produce a steam to carbon ratio of between about 2.0 and about 4.0 when the first feed stream is used;
the reformer exit temperature at the flue side is between about 1600° F. and about 2000° F. and at the reactant side is between about 1450° F. and about 1650° F.; and
partially shifted synthesis gas stream has a hydrogen to carbon monoxide molar ratio of between about 2.8 and about 3.3.

* * * * *